US011129362B2

(12) United States Patent
 Mills

(10) Patent No.: US 11,129,362 B2
(45) Date of Patent: Sep. 28, 2021

(54) PROTECTIVE ARTICLES FOR HORSES

(71) Applicant: Brett W. Mills, Wickenburg, AZ (US)

(72) Inventor: Brett W. Mills, Wickenburg, AZ (US)

( * ) Notice: Subject to any disclaimer, the term of this patent is extended or adjusted under 35 U.S.C. 154(b) by 453 days.

(21) Appl. No.: 15/793,005

(22) Filed: Oct. 25, 2017

(65) Prior Publication Data
US 2018/0043651 A1 Feb. 15, 2018

Related U.S. Application Data

(63) Continuation of application No. 13/673,323, filed on Nov. 9, 2012, now Pat. No. 9,815,255, which is a continuation of application No. 12/715,875, filed on Mar. 2, 2010, now abandoned.

(60) Provisional application No. 61/210,196, filed on Mar. 16, 2009.

(51) Int. Cl.
| *A01K 13/00* | (2006.01) |
| *B68C 5/00* | (2006.01) |
| *B32B 3/06* | (2006.01) |
| *B65B 11/00* | (2006.01) |

(52) U.S. Cl.
CPC ............ *A01K 13/007* (2013.01); *A01K 13/00* (2013.01); *B32B 3/06* (2013.01); *B65B 11/00* (2013.01); *B68C 5/00* (2013.01); *Y10T 428/24017* (2015.01)

(58) Field of Classification Search
CPC ........ B32B 3/06; A01K 13/007; A01K 13/00; A01K 13/006; B68C 5/00; B65B 11/00; A01L 15/00; A01L 13/00; A01L 3/00; A01L 3/02; A01L 3/04; A01L 3/06; A01L 5/00; A01L 9/00; A43B 1/00; A43B 1/0081; A43B 1/009; A43B 3/0036; A43B 3/02; A43B 3/16; A43B 3/18; A43B 3/22; A43B 3/26; A43B 5/002; A43B 5/004; A43B 5/006; A43B 5/04; A43B 5/0401; A43C 1/00; A43C 1/04; A43C 5/00;
(Continued)

(56) References Cited

U.S. PATENT DOCUMENTS

| 756,792 A | 4/1904 | Keller |
| 1,479,000 A | 1/1924 | Keller |
| 2,474,446 A | 6/1949 | Warren |

(Continued)

*Primary Examiner* — Kathleen I Alker
(74) *Attorney, Agent, or Firm* — Leber IP Law; Celia H. Leber

(57) ABSTRACT

A protective article for a horse includes a protective member and a replaceable securing member. The protective member includes a body portion extending between a pair of opposing ends and dimensioned to be wrapped around and secured to a horse's body part, and further includes a first engagement member coupled to the body portion adjacent one end, and a second engagement member coupled to the body portion adjacent the other end. The replaceable securing member is adapted to be selectively engaged with the engagement members in a manner that urges the engagement members towards one another. The replaceable securing member includes a first securing assembly adapted to be manually reversibly secured to the first engagement member, and a second securing assembly adapted to be manually reversibly secured to the second engagement member, the first securing assembly securing to the first engagement member independently of the second securing assembly.

9 Claims, 2 Drawing Sheets

(58) Field of Classification Search
CPC .. A43C 7/00; A43C 9/00; A43C 11/00; A43C 11/008; A43C 11/08; A43C 11/1493
See application file for complete search history.

(56) References Cited

U.S. PATENT DOCUMENTS

| | | | |
|---|---|---|---|
| 2,886,935 A | | 5/1959 | Shelton |
| 4,079,527 A * | | 3/1978 | Antonious ............ A43C 11/008 36/50.1 |
| 4,126,951 A * | | 11/1978 | Antonious ............ A43B 1/0081 24/306 |
| 4,548,026 A | | 10/1985 | Shidner |
| 4,566,207 A | | 1/1986 | Struntz |
| 4,901,452 A * | | 2/1990 | Wang ................. A43C 11/1493 24/712 |
| 4,907,352 A * | | 3/1990 | Ginsberg ............ A43C 11/1493 12/113 |
| 6,295,743 B1 * | | 10/2001 | Brooks .................... A43B 7/20 36/105 |
| 6,526,920 B1 | | 3/2003 | Griffin |
| 6,662,537 B1 | | 12/2003 | Wilson |
| 7,434,378 B2 | | 10/2008 | Wilson |
| 7,437,837 B2 | | 10/2008 | Jacobs |
| 7,445,051 B2 | | 11/2008 | Ruetenik |
| 7,650,706 B2 * | | 1/2010 | Wartel ................. A43B 1/0081 24/712.3 |
| 2004/0003516 A1 * | | 1/2004 | Jacobs ............... A43C 11/1493 36/50.1 |
| 2005/0229428 A1 * | | 10/2005 | Holcomb ................. A43B 3/24 36/7.1 R |
| 2006/0064950 A1 | | 3/2006 | Ford |
| 2007/0039566 A1 * | | 2/2007 | Krottinger ........... A01K 13/007 119/850 |
| 2007/0107389 A1 | | 5/2007 | Reutenik |
| 2007/0113524 A1 | | 5/2007 | Lander |
| 2007/0175064 A1 * | | 8/2007 | Culton ............... A43C 11/1493 36/7.1 R |
| 2007/0277398 A1 * | | 12/2007 | Davis ................... A43B 1/0081 36/50.1 |
| 2008/0000110 A1 * | | 1/2008 | Gazzola ............ A43C 11/1493 36/131 |
| 2009/0100808 A1 | | 4/2009 | Ford |
| 2014/0173944 A1 * | | 6/2014 | Dromms ................. A43B 3/30 36/136 |
| 2015/0033583 A1 * | | 2/2015 | Loverin ................ A43C 11/06 36/100 |
| 2016/0324257 A1 * | | 11/2016 | Ko ....................... A43B 3/0073 |

* cited by examiner

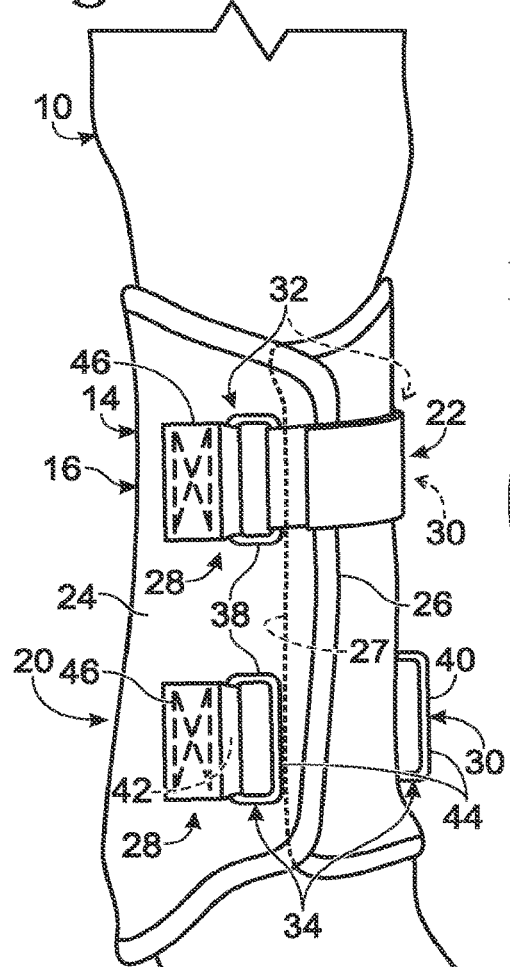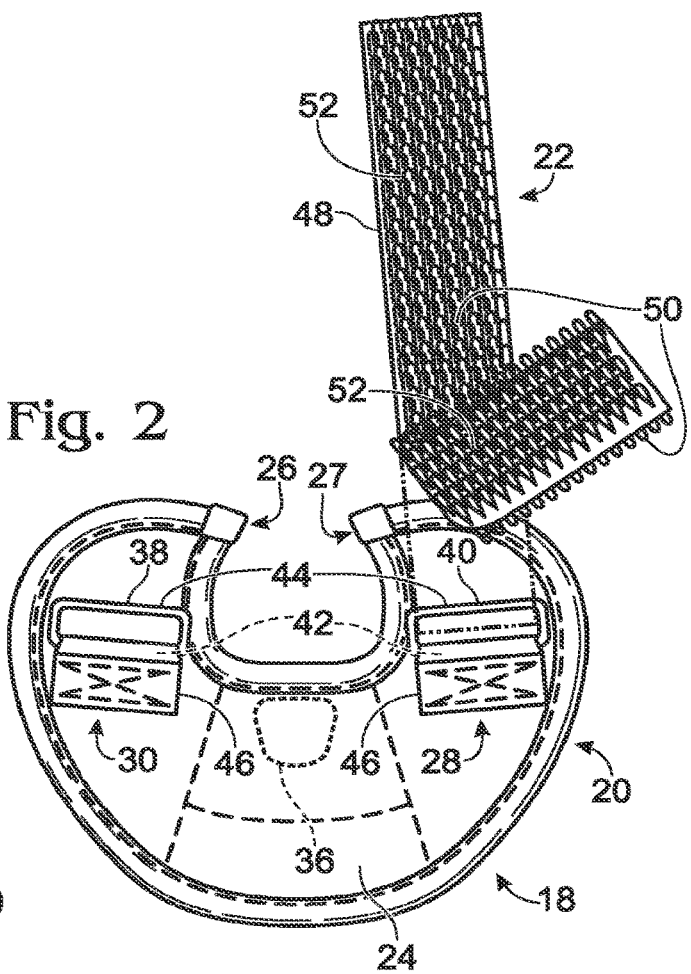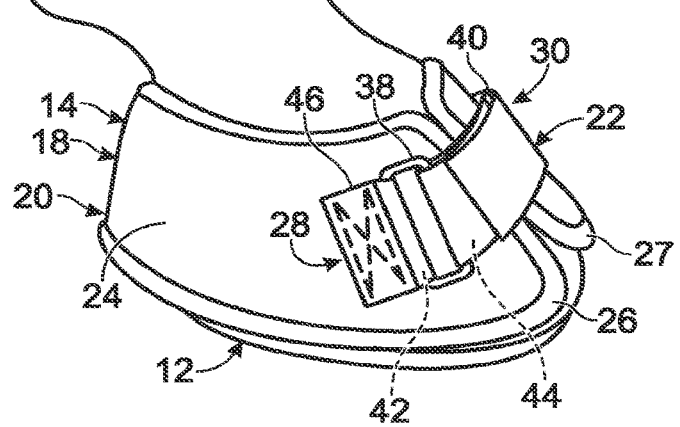

PROTECTIVE ARTICLES FOR HORSES

RELATED APPLICATION

This application is a continuation application of U.S. patent application Ser. No. 13/673,323, filed Nov. 9, 2012, which is a continuation of U.S. patent application Ser. No. 12/715,875, filed Mar. 2, 2010, which claims the benefit under 35 U.S.C. § 119(e) to U.S. Provisional Patent Application Ser. No. 61/210,196 entitled "Replaceable Closure Strap for Equine Sport Boots," filed Mar. 16, 2009, the entire contents of which is hereby incorporated by reference.

BACKGROUND

Protective articles, such as boots and leg wraps, have been developed to reduce or prevent injuries to horses resulting from external impact. These protective articles typically include a padded protective structure that is wrapped around a horse's body part and secured to the body part with a fastener that is stitched, riveted or otherwise permanently attached to the protective structure. Examples of protective articles are shown in U.S. Pat. Nos. 4,548,026, 6,662,537, and 7,434,378, and U.S. Patent Application Publication Nos. 20060064950 and 20070107389, the complete disclosures of which are herein incorporated by reference for all purposes.

Protective articles for horses are submitted to harsh conditions that cause them to wear out rapidly. The fasteners, particularly those made with the proprietary hook and loop fasteners, such as the Velcro® brand fasteners sold by Velcro USA Inc. of Manchester, N.H., U.S.A., often fail to properly function before the padded protective structure wears out.

BRIEF DESCRIPTION OF THE DRAWINGS

FIG. 1 shows a horse's leg and hoof, with an example of a protective leg wrap covering at least a portion of the lower leg, and an example of a protective boot covering at least a portion of the hoof.

FIG. 2 is a top down view of an example of a protective boot, including a protective member and a replaceable securing member.

DETAILED DESCRIPTION

Figure 3:
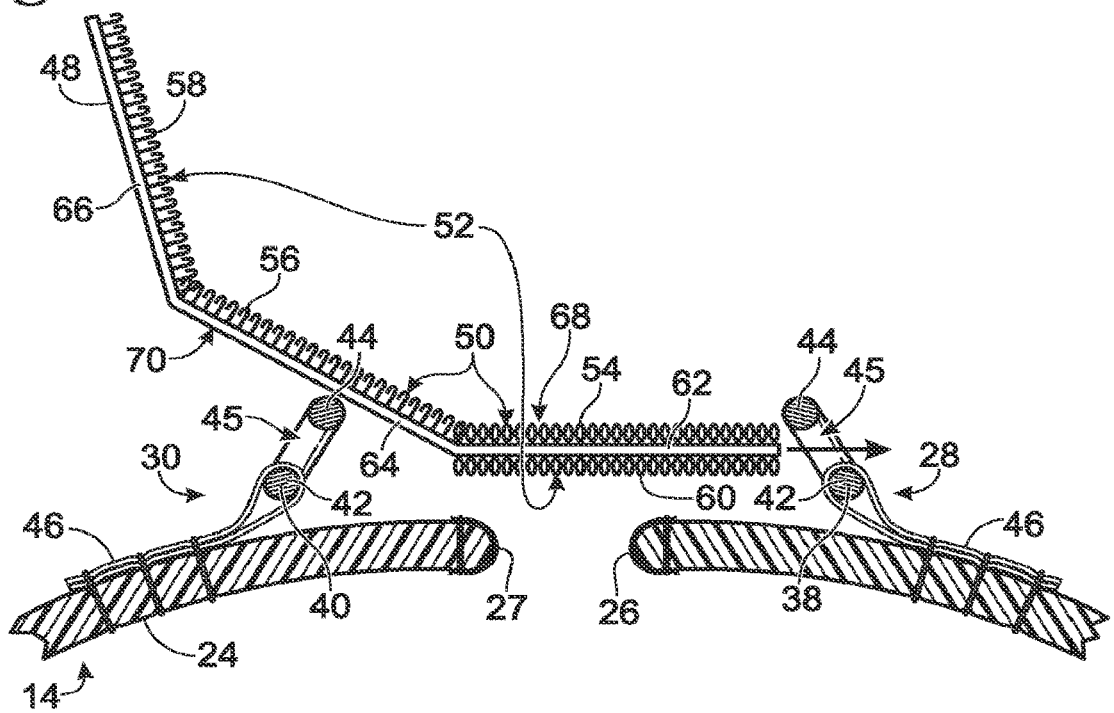
FIG. 3 is a cross sectional schematic showing an example of a replaceable securing member being secured to a protective member.

The present disclosure describes examples of protective articles for horses or other hoofed animals having replaceable securing mechanisms (i.e., fasteners). FIG. 1 shows a horse's leg 10 and hoof 12 with exemplary protective articles 14, such as a leg wrap 16 and a protective boot 18, secured thereto. Specifically, protective leg wrap 16 is shown partially secured to at least a portion of the leg, and protective boot 18 is shown secured to at least a portion of the hoof. The protective articles may be formed of any suitable materials consistent with their functions, including nylons, fabrics, rubbers, neoprenes, metals, plastics, foams or other padding materials, and any other suitable materials or combinations of materials. Other forms of protective articles may also be used for the same or different parts of an animal. Each protective article 14 may include a protective member 20, and one or more replaceable securing members 22.

The protective member 20 may include a protective body portion 24 extending between a pair of opposing ends 26 and 27 and dimensioned and shaped to be wrapped around at least a portion of a selected body part of a horse, and secured to the selected body part in a secured position by urging the pair of opposing ends towards each another. In some cases, after the opposing ends have been urged towards one another, the opposing ends may overlap with one another when the protective body portion is in the secured position, such as is shown with the leg wrap 14 in FIG. 1. The protective member also may include at least one set of engagement members, each set including a first engagement member 28 coupled to the body portion adjacent opposing end 26, and a second engagement member 30 coupled to the body portion adjacent opposing end 27. As discussed below, the first and second engagement members may be engaged with and secured to a replaceable securing member 22 in a manner that urges the first and second engagement members, and thus the pair of opposing ends, towards and in some cases past each other.

The protective body portion 24 of each protective article 14 may include padded or other protective material(s) positioned to protect the selected body part of the horse when the body portion is in the secured position. For example, the leg wrap 16 may include a generally flat body portion 24 having padded materials positioned generally between opposing ends 26 and 27. The body portion of the leg wrap may be dimensioned and shaped to be wrapped around at least a portion of a horse's leg 10 so that the padded materials are positioned over at least a portion of the medial side of the leg. The body portion of the leg wrap then may be secured to the leg in a secured position by engaging a replaceable securing member 22 with the first and second engagement members 28 and 30 in a manner that urges the first and second engagement members, and thus the opposing ends, towards one another on the lateral side of the leg. When in the secured position, the padded materials of the leg wrap may protect at least portions of the horse's body part. In this example, the medial side of the leg is covered and thereby protected from impact. Although FIG. 1 shows the leg wrap partially secured to the horse's leg with one replaceable securing member engaged with a first set 32 of first and second engagement members, the leg wrap may be fully secured to the horse's leg by engaging a second securing member with a second set 34 of first and second engagement members. Some leg wraps may have only a single set of first and second engagement members, and thus may be fully secured to a horse's leg with a single replaceable securing member.

The body portion 24 of the boot 18 also may include padded material(s) positioned to protect the selected body part of the horse when the body portion is in the secured position. As shown in FIGS. 1 and 2, a boot may include a body portion 24 having padded materials positioned during use in a generally frusto-conical shape extending generally between the pair of opposing ends 26. The body portion of the boot may be dimensioned and shaped to be wrapped around at least a portion of a horse's hoof 12 so that the padded materials are positioned over at least a portion of the back, sides and top of the hoof. The body portion of the boot then may be secured to the hoof in a secured position by engaging a replaceable securing member 22 with the first and second engagement members 28 and 30 in a manner that urges the first and second engagement members, and thus the opposing ends, towards one another on the front side of the hoof. When in the secured position, shown in FIG. 1, the padded materials may protect at least portions of the back, sides and/or top of the hoof from impact. The body portion of the boot also may include a protrusion 36 on the interior surface of the protective body that is positioned to engage the bulb of the hoof when the boot is in the secured position, thereby inhibiting rotation of the boot on the horse's hoof and keeping the padded materials in their proper protective positions.

The first and second engagement members 28 and 30 may include any structure for manually reversibly coupling the replaceable securing member 22 to the body portion 24 proximate the opposing ends 26. For example, the first and second engagement members each may include any device secured to one of the pair of opposing ends that defines or includes an aperture, passageway, or other form of purchase through, with, or against which the replaceable securing member can be manually reversibly secured, including but not limited to hoops, loops, hooks, rings, or slits, and/or selected portions of snaps, buttons, hook and loop fasteners, etc. It should be appreciated that if the first and second engagement members include selected portions of snaps, buttons, or hook and loop fasteners, then the replaceable securing member may include the corresponding complimentary portion of such fasteners necessary for manually reversibly securing the replaceable securing member thereto without damaging the associated protective member.

In the embodiments shown in FIGS. 1 and 2, the first and second engagement members may, respectively, include first and second rings 38 and 40. Any type of ring may be used, although it has been found that generally rectangular box rings work well for engaging strap-like replaceable securing members. The first and second rings each may include a first side 42 and a second side 44, and may have an opening or passageway 45 between them. The first side 42 may be attached to an associated one of the opposing ends 26 and 27 with an attachment member 46, such as a loop of stitched fabric or other suitable material. As discussed further below, the second side 44 may be adapted to be manually reversibly secured to the replaceable securing member.

It has been found that the position of the first and second engagement members relative to the pair of opposing ends 26 and 27 may affect how the replaceable securing member exerts securing forces on the protective body portion 24 for securing the protective article to the horse's selected body part. For example in the case of a boot 18, it has been determined that coupling the replaceable securing member to each engagement member at positions approximately 1-2 inches from the associated proximal opposing end 26 or 27 works well, and about 1.5 inches from the proximal opposing end works particularly well. More generally, in the assembled position on a horse's hoof, a spacing between the engagement members of about 2-4 inches works well, and a spacing of about 3 inches works particularly well.

Securing the replaceable securing member to the engagement members at these positions allows a user to apply particularly effective securing forces to the protective body member when it is secured to the horse's body part. For embodiments of engagement members that include rings, such as first and second rings 38 and 40, each of the second sides 44 that are used to couple the replaceable securing member to the protective body portion may therefore be positioned approximately 1-2 inches from the proximal opposing end, and preferably about 1.5 inches from the proximal opposing end. Moreover, during use when the replaceable securing member is securing the protective body portion 24 in the secured position on a horse's body part, such as a hoof, the second sides 44 of the first and second rings 38 and 40 may be configured to be substantially parallel. When the ring sides 44 are parallel, the replaceable securing member may apply substantially even securing forces along the length of the second sides 44 in contact with the replaceable securing member, and thus to the protective body portion. If uneven securing forces are applied by the replaceable securing member to the protective body portion, then the protective body portion may tend to deform relative to the shape of the body part, such as a hoof. Depending on the deformation, this may tend to dislodge the protective body portion from its proper position on the horse's body part during use.

As discussed above, the replaceable securing member 22 may be adapted to be selectively engaged with the first and second engagement members 28 and 30 in a manner that urges the first and second engagement members, and thus the pair of opposing ends 26 and 27, towards one another. The replaceable securing member may include a generally elongate element 48, such as a strap, belt, rope, cord, etc. coupled to a first securing assembly 50 adapted to be manually reversibly secured to the first engagement member 28, and a second securing assembly 52 adapted to be manually reversibly secured to the second engagement member 30. The first securing assembly may be adapted to be secured to the first engagement member independently of the second securing assembly, such that the replaceable securing mechanism can be anchored to the first engagement member prior to engaging the replaceable securing member with the second engagement member. The second securing assembly then may be engaged with and manually reversibly secured to the second engagement member in a manner that secures the protective body portion in the secured position on the horse's body part. It should be appreciated that the term "manually reversibly secured" in this context means that each securing assembly can be easily and reversibly secured to and unsecured from the engagement members without affecting the structural integrity of the replaceable securing mechanism and the protective member generally.

The first and second securing assemblies 50 and 52 may include any devices suitable for engaging and securing to the first and second engagement members. The first and second securing assemblies may include hooks, buckles, rings, hook and loop fasteners, selected portions of snaps, buttons, or hook and loop fasteners, or any other suitable structures. As discussed above, if the first and second engagement members include selected portions of snaps, buttons, or hook and loop fasteners, then the replaceable securing member may include the corresponding complementary portion of such fasteners necessary for manually reversibly securing the replaceable securing member thereto.

Figure 4:
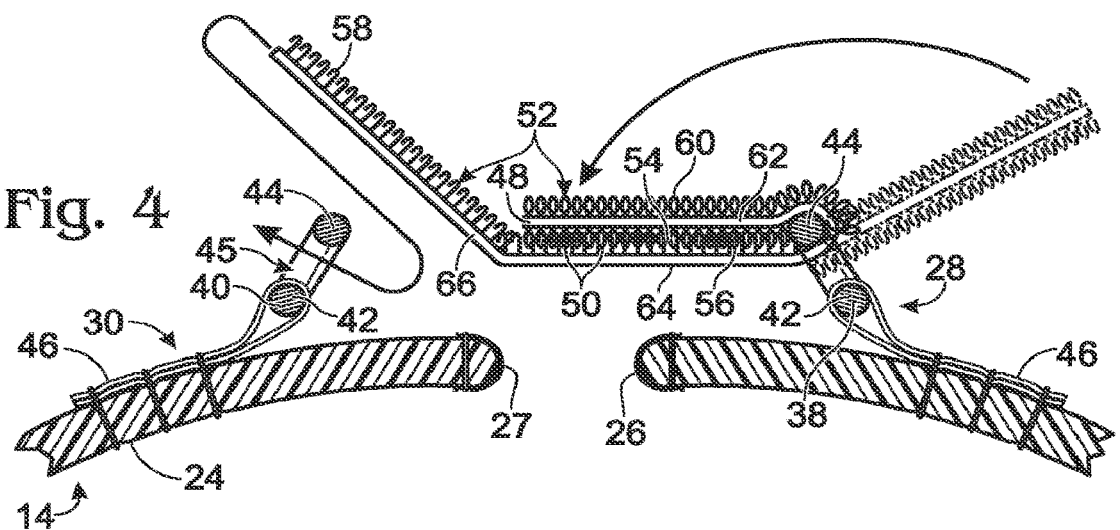
FIG. 4 is another cross sectional schematic showing the replaceable securing member of FIG. 3 being secured to the protective member.
Figure 5:
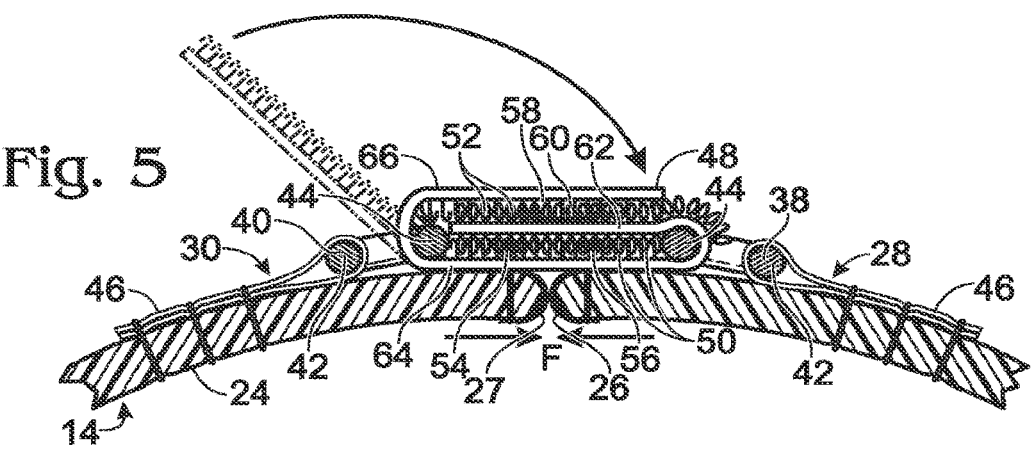
FIG. 5 is another cross sectional schematic further showing the replaceable securing member of FIG. 3 being secured to the protective member.

In some embodiments, such as the one shown in FIGS. 3-5, the replaceable securing member 22 may include a strap 48, the first securing assembly 50 may include first and second securing elements 54 and 56 coupled to the strap, and the second securing assembly 52 may include third and fourth securing elements 58 and 60 coupled to the strap. The first securing assembly 50 may be manually reversibly secured to the first engagement member 28 by securing the first securing element 54 to the second securing element 56 with the strap 49 extending around the first engagement member. For example, the first and second securing elements may be complementary hook and loop fasteners, although any suitable securing elements may be used. The second securing assembly 52 may then be manually reversibly secured to the second engagement member 30 by securing the third securing element 58 to the fourth securing element 60 with the strap extending around the second engagement member. The third and fourth securing elements also may be complementary hook and loop fasteners, although any suitable securing elements may be used. Although the second and fourth securing elements 56 and 60 are shown to be separate structures in FIGS. 3-5, it should be appreciated that the second and fourth securing elements also may be portions of the same structure.

In some embodiments, such as the one shown in FIGS. 3-5, the strap 48 may include first, second and third contiguous segments 62, 64 and 66, and first and second opposing sides 68 and 70. The first securing element 54 may be coupled to the first segment 62 on the first side 68, the second securing element 56 may be coupled to the second segment 64 on the first side 68, the third securing element 58 may be coupled to the third segment 66 on the first side 68, and the fourth securing element 60 may be coupled to the first segment 62 on the second side 70. The first, second and third segments may each have substantially the same length, or may have different lengths. Additionally or alternatively, if the second and third securing elements 56 and 58 are both hook portions or are both loop portions of hook and loop fasteners, such as is shown in FIG. 3, then the second and third contiguous segments 64 and 66 either may include (1) a continuous stretch of the hook or loop securing element extending along the length of the second and third contiguous segments, or (2) a non-continuous stretch of hook or loop securing element with gaps between the securing elements positioned along the length of the second and third contiguous segments.

The replaceable securing member 22 described above allows for a step-wise process of securing the replaceable securing member to the first and second engagement members 28 and 30 in a manner that quickly, easily and manually reversibly secures the protective body portion 24 to the horse. First, the process may include, for example, manually reversibly securing the first securing assembly 50 to the first engagement member 28 (or the second engagement member 30) prior to engaging the second securing assembly 52 with the second engagement member 30 (or the first engagement member 28). For example, as shown in FIGS. 3-4, the first segment 62 of strap 48 may be engaged with the first engagement member 28, such as by inserting the first segment through passageway 45 defined in the first engagement member. The first securing element 62 then may be secured to the second securing element 64, with the strap extending around the first engagement member 28, such as by folding the strap around the first engagement member and engaging the first and second securing elements with one another, as shown in FIG. 4. At this point, the first securing assembly is secured to the first engagement member, thereby anchoring the replaceable securing member to the first engagement member.

After securing the first securing assembly 50 to the first engagement member 28, the process may include manually reversibly securing the second securing assembly 52 to the second engagement member 30 in a manner that draws the first and second engagement members, and thus the pair of opposing ends 26, towards one another to a secured position. For example, as shown in FIGS. 4-5, the third segment 66 of strap 48 may be engaged with the second engagement member 30, such as by inserting the third segment through passageway 45 defined in the second engagement member. The third securing element 66 then may be secured to the fourth securing element 68, with the strap extending around the second engagement member 30, such as by folding the strap around the first engagement member and engaging the third and fourth securing elements with one another, as shown in FIG. 5. When the second securing assembly is secured to the second engagement member, the replaceable securing member 22 may apply a securing force F to the first and second engagement members that urges the first and second engagement members, and thus the pair of opposing ends, towards one another. For example, when the third securing element is moved into a position where it can be engaged with the fourth securing element, the length of strap between the first and second engagement members may shorten, thereby urging the first and second engagement members together.

It will be appreciated that a securing assembly as has been described may advantageously include a protective article with a replaceable fastener, so that when an old fastener fails, a new fastener may be used without the need to also replace the entire padded protective structure. This may prolong the useable life of the padded protective structure.

It is believed that this disclosure encompasses multiple distinct inventions with independent utility. While each of these inventions has been described in its best mode, numerous variations are contemplated. All novel and non-obvious combinations and subcombinations of the described and/or illustrated elements, features, functions, and properties should be recognized as being included within the scope of this disclosure. Applicant reserves the right to claim one or more of the inventions in any application related to this disclosure. Where the disclosure or claims recite "a," "a first," or "another" element, or the equivalent thereof, they should be interpreted to include one or more such elements, neither requiring nor excluding two or more such elements. Ordinal indicators, such as first, second or third, for identified elements in the specification or the claims, are used to distinguish between the elements and do not indicate either a required or limited number of such elements or a particular position or order of such elements unless otherwise specifically indicated. Accordingly, the same ordinal indicators may be used on different elements in different situations.

What is claimed is:

1. A method comprising:
providing a protective article for a hoofed animal, the protective article comprising a fabric body having two ends and a pair of metal receiving elements disposed on the fabric body, each of the metal receiving elements comprising a closed loop having at least one linear side,
providing a removable fabric strap configured to be threaded through the receiving elements, the fabric strap including portions having hook fasteners and portions having loop fasteners, and
threading the strap through the receiving elements and folding the strap about the receiving elements in thirds, with one of the receiving elements on each side of the folded strap, such that substantially all of the loop fasteners are engaged by the hook fasteners, both of the receiving elements are releasably captured by the strap,
wherein the fabric strap is configured such that when the fabric strap is folded about the receiving elements in thirds the two ends of the fabric body touch or overlap one another.

2. The method of claim 1 wherein the receiving elements are pivotably mounted on the fabric body.

3. The method of claim 1 wherein, when the fabric strap is threaded through the receiving elements and folded over, substantially all of the loop fasteners are sandwiched between opposed areas of the hook fasteners.

4. The method of claim 1 wherein threading the strap through the receiving elements includes threading an end of the fabric strap adjacent the loop fasteners through one of the receiving elements and folding the end over so that the portions having hook fasteners engage the portions having loop fasteners, and wherein doing so causes the fabric strap to be releasably retained on the receiving element through which the end was threaded.

5. The method of claim 1 wherein the metal receiving elements comprise rectangular box rings.

6. A protective article for a hoofed animal, the protective article comprising:
   a protective member having two ends;
   a pair of metal receiving elements disposed on the protective member, each of the metal receiving elements comprising a closed loop having at least one linear side, and
   a removable fabric strap configured to be threaded through the receiving elements, the fabric strap including portions having hook fasteners and portions having loop fasteners,
   wherein the strap is configured so that when the strap is threaded through the receiving elements and folded about the receiving elements in thirds, with one of the receiving elements on each side of the folded strap, substantially all of the loop fasteners are engaged by the hook fasteners and both of the receiving elements are releasably captured by the strap, and
   wherein the receiving elements are disposed on the protective member and the fabric strap is configured such that when the fabric strap is folded about the receiving elements in thirds the two ends of the protective member touch or overlap one another.

7. The article of claim 6 wherein the receiving elements are pivotably mounted on the protective member.

8. The article of claim 6 wherein, when the fabric strap is threaded through the receiving elements and folded over, substantially all of the loop fasteners are sandwiched between opposed areas of the hook fasteners.

9. The article of claim 6 wherein the metal receiving elements comprise rectangular box rings.

\* \* \* \* \*